(12) United States Patent
Cavazos Sepulveda et al.

(10) Patent No.: US 12,459,816 B2
(45) Date of Patent: *Nov. 4, 2025

(54) HYDROGEN SULFIDE DISSOCIATION USING REACTIVE SULFUR SPECIES

(71) Applicant: Saudi Arabian Oil Company, Dhahran (SA)

(72) Inventors: Adrian Cesar Cavazos Sepulveda, Nuevo Leon (MX); Damian Pablo San Roman Alerigi, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 536 days.

This patent is subject to a terminal disclaimer.

(21) Appl. No.: 17/820,330

(22) Filed: Aug. 17, 2022

(65) Prior Publication Data

US 2024/0059564 A1   Feb. 22, 2024

(51) Int. Cl.
  *C01B 17/04*   (2006.01)
  *C01B 3/04*   (2006.01)
  *C09K 8/38*   (2006.01)

(52) U.S. Cl.
  CPC ............ *C01B 17/0495* (2013.01); *C01B 3/04* (2013.01); *C09K 8/38* (2013.01)

(58) Field of Classification Search
  None
  See application file for complete search history.

(56) References Cited

U.S. PATENT DOCUMENTS

| | | |
|---|---|---|
| 4,405,424 A | 9/1983 | Graetzel et al. |
| 4,948,980 A | 8/1990 | Wedekamp |
| 5,200,156 A | 4/1993 | Gesellschaft et al. |
| 6,412,557 B1 | 7/2002 | Ayasse et al. |
| 7,030,391 B2 | 4/2006 | Zagrobelny |
| 7,140,181 B1 | 11/2006 | Jensen et al. |
| 7,220,391 B1 | 5/2007 | Huang et al. |
| 7,985,397 B2 | 7/2011 | Matsumoto et al. |

(Continued)

FOREIGN PATENT DOCUMENTS

| | | |
|---|---|---|
| EP | 1723104 | 11/2006 |
| KR | 20190116290 | 10/2019 |

OTHER PUBLICATIONS

U.S. Appl. No. 17/889,517, filed Aug. 17, 2022, Sepulveda.

(Continued)

*Primary Examiner* — John J Figueroa
(74) *Attorney, Agent, or Firm* — Fish & Richardson P.C.

(57) ABSTRACT

The disclosure relates to methods of irradiating a gas containing hydrogen sulfide ($H_2S$) with high energy light to photolytically cleave some of the hydrogen sulfide in the gas to form sulfur-containing reactive species. The sulfur-containing reactive species act as autocatalysts that react with some of the remaining hydrogen sulfide in the gas to generate hydrogen gas and one or more sulfur-containing products. The methods remove hydrogen sulfide from the gas and produce hydrogen gas. The methods can be implemented in a component of a hydrocarbon producing well (e.g., a wellhead, a flow line, a production casing, a production tubing), a component used to transport the gas mixture produced by the well (e.g., a transportation pipeline), a gas treatment system (e.g., a tail gas treatment system), a borehole and/or an underground formation.

17 Claims, 7 Drawing Sheets

Sulfur-containing reactive species (e.g., HS reactive species) + Hydrogen sulfide ($H_2S$) and other sulfur species  →[High energy light]  Sulfur-containing products/catalysts (polysulfanes, elemental sulfur)

(56) References Cited

U.S. PATENT DOCUMENTS

| | | | | |
|---|---|---|---|---|
| 8,372,267 | B2* | 2/2013 | Kressmann | C10G 45/04 |
| | | | | 208/213 |
| 8,440,154 | B2 | 5/2013 | Fahs, II et al. | |
| 10,214,697 | B2 | 2/2019 | Gargano et al. | |
| 10,654,022 | B2 | 5/2020 | Netemeyer et al. | |
| 12,043,794 | B2* | 7/2024 | Meng | C23F 11/149 |
| 2010/0212893 | A1 | 8/2010 | Araghi et al. | |
| 2024/0060411 | A1* | 2/2024 | Sepulveda | E21B 43/34 |

OTHER PUBLICATIONS

Baldovi et al., "Gas-Phase Photochemical Overall H2S Splitting by UV Light Irradiation," ChemSusChem, 2017, 10(9): 1-6, 6 pages.

Ellis et al., "Kinetics of elemental sulfur reduction by petroleum hydrocarbons and the implications for hydrocarbon thermal chemical alteration," Geochimica et Cosmochimica Acta, 2019, 251:192-216, 55 pages.

Faraji et al., "The direct conversion of hydrogen sulfide to hydrogen and sulfur," International journal of hydrogen energy, 1998, 23(6):451-456, 6 pages.

Hao et al., "Metal sulfide photocatalysis: visible-light-induced organic transformations," ChemCatChem, 2019, 11.5:1378-1393, 17 pages.

Huang et al., "UV-to-IR highly transparent ultrathin diamond nanofilms with intriguing performances: Anti-fogging, self-cleaning and self-lubricating," Applied Surface Science, 2020, 527:146733, 24 pages.

Hurai et al., "Hydrogen recovery from H2S-CH4 inclusions trapped in quartz triggered by green laser-induced photolysis of polysulphane-sulphur bonds," Applied Geochemistry, 2019, 106:75-81, 22 pages.

Lan-Yan et al., "Photolysis of low concentration H2S under UV/VUV irradiation emitted from microwave discharge electrodeless lamps," Chemosphere, 2008, 71.9:1774-1780, 7 pages.

Li et al., "Predicting sulfur solubility in hydrogen sulfide, carbon dioxide, and methane with an improved thermodynamic model," RSC Advances, 2018, 8:16069-16081, 13 pages.

Liu et al. "Inorganic hydrogen polysulfides: chemistry, chemical biology and detection," British journal of pharmacology, 2019, 176.4: 616-627, 12 pages.

Migdisov et al., "Estimates of the second dissociation constant of H2S from the surface sulfidation of crystalline sulfur," Geochimica et Cosmochimica Acta, 2002, 66.10:1713-1725, 13 pages.

Mross et al., "Terahertz spectroscopy of molten sulfur using a tunable THz source," SPIE Proceedings, Terahertz Physics, Devices, and Systems, 2006, vol. 6374, Oct. 2006, 6 pages.

Nunnally et al., "Dissociation of H2S in non-equilibrium gliding arc "tornado" discharge," International journal of hydrogen energy, 2009, 34.18:7618-7625, 8 pages.

Steudel, "Liquid sulfur," Springer, Berlin, Heidelberg, 2003, 81-116, 37 pages.

Wang et al., "Monolithic integration of deep ultraviolet LED with a multiplicative photoelectric converter," Nano Energy, 2019, 66:104181, 33 pages.

Wilson, "On the near ultraviolet photodissociation of hydrogen sulphide," Molecular Physics, 1996, 88.3:841-858, 20 pages.

Zhou et al., "Ultraviolet photolysis of H2S and its implications for SH radical production in the interstellar medium," Nature communications, 2020, 11.1:1-8, 8 pages.

* cited by examiner

HYDROGEN SULFIDE DISSOCIATION USING REACTIVE SULFUR SPECIES

FIELD

The disclosure relates to methods of irradiating a gas containing hydrogen sulfide ($H_2S$) with high energy light to photolytically cleave some of the hydrogen sulfide in the gas to form sulfur-containing reactive species. The sulfur-containing reactive species act as autocatalysts that react with some of the remaining hydrogen sulfide in the gas to generate hydrogen gas ($H_2$) and one or more sulfur-containing products. The methods remove hydrogen sulfide from the gas and produce hydrogen gas. The methods can be implemented in a component of a hydrocarbon producing well (e.g., a wellhead, a flow line, a production casing, a production tubing), a component used to transport the gas mixture produced by the well (e.g., a transportation pipeline), a gas treatment system (e.g., a tail gas treatment system), a borehole and/or an underground formation.

BACKGROUND

It is common for a well to produce a gas mixture containing hydrocarbons (e.g., methane, ethane, butane, propane), as well as one or more additional constituents, such as hydrogen sulfide. The hydrogen sulfide can cause corrosion of one or more components of the well or one or more components used to transport the hydrocarbon-containing gas mixture. Therefore, it is generally desirable to reduce the amount of hydrogen sulfide in the gas mixture. It can also be desirable to produce hydrogen gas.

SUMMARY

The disclosure relates to methods of irradiating a gas containing hydrogen sulfide with high energy light to photolytically cleave some of the hydrogen sulfide in the gas to form sulfur-containing reactive species. The sulfur-containing reactive species act as autocatalysts that react with some of the remaining hydrogen sulfide in the gas to generate hydrogen gas and one or more sulfur-containing products. The methods remove hydrogen sulfide from the gas and produce hydrogen gas. The methods can be implemented in a component of a hydrocarbon producing well (e.g., a wellhead, a flow line, a production casing, a production tubing), a component used to transport the gas mixture produced by the well (e.g., a transportation pipeline), a gas treatment system (e.g., a tail gas treatment system), a borehole and/or an underground formation.

Generally, the high energy light can be of any appropriate wavelength. In some embodiments, the light is near ultraviolet (UV) light, UV light or has a shorter wavelength.

Optionally, the methods can include one or more steps in which the sulfur-containing reactive species and/or the sulfur-containing products undergo additional chemical changes, thereby creating additional species that can be used to dissociate hydrogen sulfide to remove additional hydrogen sulfide and to produce additional hydrogen gas.

In some embodiments, the methods of the disclosure include exposing the sulfur-containing products to relatively low energy light (e.g., green laser light, red laser light) to produce additional species (e.g., hydrogen radicals) capable of dissociating hydrogen sulfide (e.g., via photocleavage).

In certain embodiments, the methods of the disclosure include reacting the sulfur-containing reactive species with a ceramic species (e.g., $Fe_2O_3$) that can adsorb the sulfur-containing reactive species to generate a ceramic-sulfur species (e.g. $Fe_2O_xS_y$) capable of reacting with hydrogen sulfide to further drive the dissociation of hydrogen sulfide.

In some embodiments, the methods of the disclosure include using relatively high temperatures (e.g. at least 70° C., at least 115° C.) and/or pressures, such as may be present in a hydrocarbon producing well and/or a component to transport a hydrocarbon produced by a hydrocarbon producing well, to further drive the dissociation of hydrogen sulfide. Such embodiments can involve the use of natural geothermal energy.

In certain known methods, catalysts (e.g., photocatalysts) are disposed in a hydrocarbon producing well to remove hydrogen sulfide. However, in such methods, the catalyst can degrade over time (e.g., due to photobleaching) and lose its efficiency. As a result, these methods can involve interventions to replace the catalyst. Such interventions can pose significant costs and/or safety hazards. In contrast, the systems and methods of the disclosure can be implemented with relatively few (if any) well interventions. In some embodiments, the methods of the disclosure can be implemented without adding an external catalyst (e.g., a photocatalyst) to the gas containing the hydrogen sulfide. In contrast, in certain embodiments, the methods of the disclosure rely on forming an autocatalyst (e.g., by exposing hydrogen sulfide to high energy light to generate sulfur-containing reactive species).

The methods of the disclosure can enable the dissociation of hydrogen sulfide with relatively little energy compared with certain known methods of hydrogen sulfide dissociation, such as, for example, photonic hydrogen sulfide dissociation. In some embodiments, this is achieved by driving the dissociation reaction through sulfur-containing reactive species and can remove hydrogen sulfide from a hydrocarbon-containing gas mixture generated by a hydrocarbon producing well. More generally, the methods of the disclosure can be implemented more easily than certain other known methods of hydrogen sulfide dissociation, can increase the lifetime of materials, reduce component maintenance, reduce costs and/or risks related to maintenance and/or damage associated with corrosion due to hydrogen sulfide, reduce (e.g., avoid) well interventions relative to certain other methods for addressing hydrogen sulfide reduction, reduce time spend on repairs and maintenance, and/or reduce (e.g., avoid) costs and/or safety risks associated with a well intervention.

The methods of the disclosure can generate hydrogen gas using hydrogen sulfide as a starting material. In general, the methods of the disclosure can generate hydrogen gas from hydrogen sulfide using less energy than certain known methods of generating hydrogen gas from hydrogen sulfide.

The methods of the disclosure can further provide sequestration or precipitation of hydrogen sulfide, generated sulfur products and/or other containments. As an example, a sulfur-containing product generated by the methods of the disclosure can act as an absorbent and/or adsorbent species for hydrogen sulfide, one or more other generated sulfur products, and/or one or more other containments or undesired gaseous species.

In a first aspect, the disclosure provides a method, including irradiating a gas mixture including first and second portions of hydrogen sulfide ($H_2S$) with light to photolytically cleave the first portion of the hydrogen sulfide in the gas mixture, thereby generating a sulfur-containing reactive species, the gas mixture being in a member including at least one component of a hydrocarbon producing well, at least one component configured to transport a hydrocarbon produced by a hydrocarbon producing well, a gas treatment system, a borehole and/or an underground formation, and reacting the sulfur-containing reactive species with the second portion of the hydrogen sulfide in the gas mixture to generate a sulfur-containing product. The first portion of the hydrogen sulfide is different from the second portion of the hydrogen sulfide, and the light has a wavelength of at most 380 nanometers (nm).

In some embodiments, the member includes a wellhead, a flow line, a production casing, a production tubing, a tail gas treatment system, a borehole, a transportation pipeline and/or an underground formation.

In some embodiments, the sulfur-containing reactive species includes an $HS_x$ radical, where x=1-8, and/or $HS^-$.

In some embodiments, the sulfur-containing product includes polysulfanes and/or elemental sulfur.

In some embodiments, the sulfur-containing product adsorbs and/or absorbs hydrogen sulfide, polysulfides, sulfites, polysulfanes, $CS_2$, $SO_2$ and/or heavy metals.

In some embodiments, the wavelength of the light is from 100 nanometers (nm) to 380 nm.

In some embodiments, a power of the light is from 1 milliwatt to 1 megawatt.

In some embodiments, the method includes irradiating the sulfur-containing product with light having a wavelength of at least 380 nm to generate a reactive species, and reacting the reactive species with hydrogen sulfide to generate additional sulfur-containing product.

In some embodiments, irradiating the gas mixture with light to photolytically cleave the first portion of the hydrogen sulfide in the gas mixture generates hydrogen radicals.

In some embodiments, the sulfur-containing reactive species comprises a first portion of sulfur-containing reactive species and a second portion of sulfur-containing reactive species different from the first portion, and the first portion of the sulfur-containing reactive species reacts with the second portion of the sulfur-containing reactive species to generate a sulfur-containing product.

In some embodiments, the method includes reacting the sulfur-containing reactive species with a ceramic species to form a ceramic-sulfur species, and reacting the ceramic-sulfur species with an additional portion of hydrogen sulfide in the gas mixture to provide additional sulfur-containing reaction product.

In some embodiments, the member includes a wellhead, a flow line, a production casing, a production tubing, a tail gas treatment system a borehole, a transportation pipeline and/or an underground formation and the ceramic species is disposed on a surface of the member.

In some embodiments, the ceramic species includes Fe, Cr, Mg, Mn, Ca, Ce, Zn, Na, Sb, Bi, V, Ba, Sr, CaC, Zn, V, $Na_2C$, Sb, Si, Al, Li, Na, K and/or a lanthanide.

In some embodiments, the ceramic-sulfur species includes $FeS_x$, $CrS_x$, $MgS_x$, $MnS_x$, $CaS_x$, $CeS_x$, $ZnS_x$, $NaS_x$, $SbS_x$, $BiS_x$, $VS_x$, $BaS_xO_{4-y}$, $SrS_xO_{4-y}$, $FeS_xO_y$, $CrS_xO_y$, $MgS_xO_y$, $MnS_xO_y$, $CaS_xO_y$, $CeS_xO_y$, $CaCS_xO_y$, $ZnS_xO_y$, $VS_xO_y$, $Na_2CS_xO_y$, $SbS_xO_y$, $SiS_xO_y$, lanthanide sulfides, lanthanide oxy sulfides, and/or lanthanide sulfites.

In some embodiments, the sulfur-containing reactive species includes an $HS_x$ radical, where x=1-8, and/or $HS^-$.

In some embodiments, the sulfur-containing product includes polysulfanes, elemental sulfur and a product containing both the ceramic and sulfur.

In some embodiments, the sulfur-containing product adsorbs and/or adsorbs hydrogen sulfide, polysulfides, sulfites, polysulfanes, $CS_2$, $SO_2$ and/or heavy metals.

In some embodiments, the ceramic species includes $Fe_2O_3$, the ceramic-sulfur species includes $Fe_2O_xS_y$, and the sulfur-containing product includes elemental sulfur, polysulfanes, and/or $Fe_2S_{3-x}$.

In a second aspect, the disclosure provides a system, including a member including at least one component of a hydrocarbon producing well, at least one component configured to transport a hydrocarbon produced by a hydrocarbon producing well, a tail gas treatment system, a borehole and/or an underground formation, the member includes an interior space, a gas mixture comprising hydrogen sulfide, the gas mixture being disposed in the interior space of the member, a light source configured to generate light having a wavelength of at most 380 nanometers (nm), and a waveguide configured to deliver light from the light source to the interior space of the member. The light photolytically cleaves a first portion of the hydrogen sulfide in the gas mixture, thereby generating a sulfur-containing reactive species, the sulfur-containing reactive species reacts with a second portion of the hydrogen sulfide in the gas mixture to generate a sulfur-containing product, and the first portion of the hydrogen sulfide is different from the second portion of the hydrogen sulfide.

In certain embodiments, the light is UVB light and/or UVC light.

In certain embodiments, the member includes a wellhead, a flow line, a production casing, a production tubing, a tail gas treatment system, a borehole, a transportation pipeline and/or an underground formation.

DETAILED DESCRIPTION

General Introduction

Figure 1:
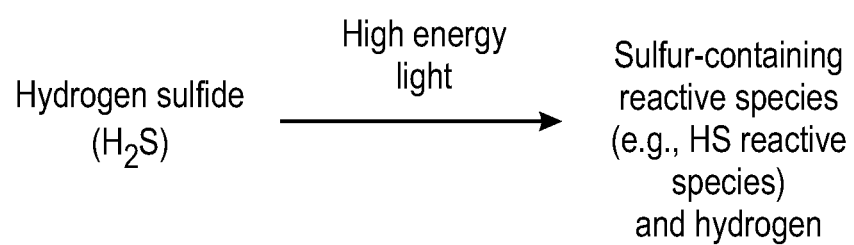
FIG. 1 is a scheme for a chemical reaction.
Figure 2:
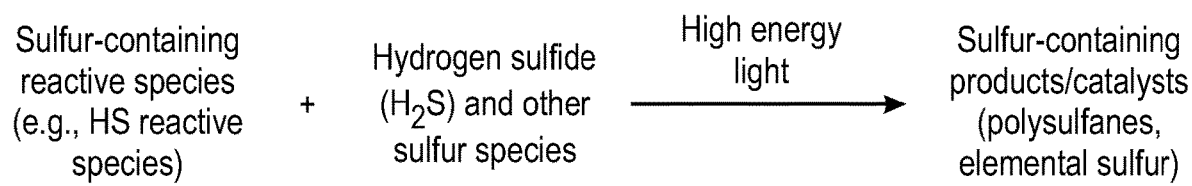
FIG. 2 is a scheme for a chemical reaction.

FIGS. 1 and 2 schematically depict general reaction schemes according to the disclosure. Generally, the methods disclosed herein include the reactions schemes depicted in FIGS. 1 and 2. Optionally, in some embodiments, the methods can further include the reaction schemes depicted in FIGS. 3 and 4 and/or FIGS. 5 and 6, as discussed in more detail below.

In FIG. 1, hydrogen sulfide is exposed to high energy light to generate sulfur-containing reactive species and hydrogen. Sulfur-containing reactive species can include, for example, a reactive HS species (e.g., a HS radical, $HS^-$) and/or $HS_x$ radicals. In FIG. 2, the sulfur-containing reactive species generated in FIG. 1 react(s) with additional hydrogen sulfide (and optionally one or more other sulfur-containing species present) in the presence of the high energy light to generate one or more sulfur-containing products (e.g., polysulfanes ($H_2S_x$), elemental sulfur). However, in some embodiments, the reaction depicted in FIG. 2 can occur without involving the high energy light. Sulfur containing reactive species can also react with other sulfur-containing reactive species to generate one or more sulfur-containing products (e.g., polysulfanes ($H_2S_x$), elemental sulfur).

The high energy light depicted in FIG. 1 can be, for example near UV light, UV light (e.g., UVA light, UVB light, UVC light) or a wavelength shorter than UV light. In general, the power of the high energy light can be selected as appropriate. In some embodiments, the wavelength does not cause methane photolysis. In certain embodiments, the relatively high energy light has a wavelength of at most 315 nm. As an example, in some embodiments, the relatively high energy light is in the UVB range (280 nm to 315 nm). As another example, in some embodiments, the relatively high energy light is in the UVC range (200 nm to 280 nm). In some embodiments, the wavelength of the high energy light is at least 100 nm (e.g., at least 125 nm, at least 280 nm) and at most 380 nm (e.g., at most 315 nm, at most 280 nm).

Generally, the power is determined by the concentration of hydrogen sulfide and the gas flow rate. In some embodiments, the high energy light an intensity of at least 1 milliwatt (e.g. at least 1 watt, at least 1 kilowatt) and at most 1 megawatt (e.g. at most 1 kilowatt, at most 1 watt).

In general, the light source used to generate the high energy light can be any coherent or incoherent light source. Examples of light sources include light emitting diodes (LEDs), superluminescent diodes (SLEDs), lasers and solar concentrators.

Without wishing to be bound by theory, it is believed that, in some embodiments, the sulfur-containing product(s) generated in FIG. 2 can absorb and/or adsorb sulfur-containing compounds and other contaminants, thereby enabling the sequestration or precipitation of various gaseous sulfur species (e.g., hydrogen sulfide, polysulfides, sulfites, polysulfanes, $CS_2$, $SO_2$) and/or heavy metal-containing species.

Relatively Low Energy Light

Figure 3:
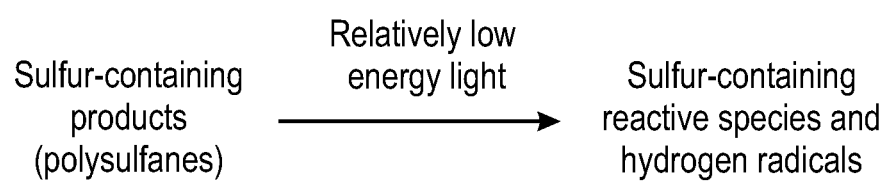
FIG. 3 is a scheme for a chemical reaction.
Figure 4:
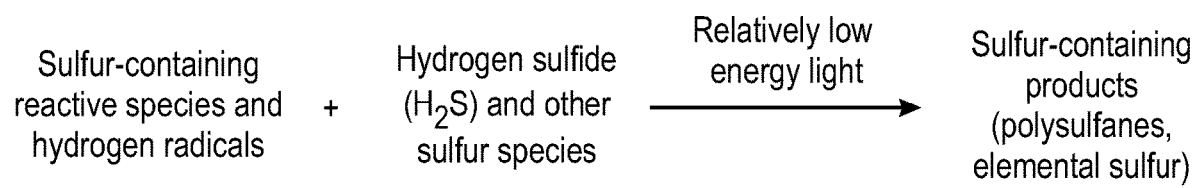
FIG. 4 is a scheme for a chemical reaction.

In some embodiments, the methods of the disclosure further include exposing the sulfur-containing reactive species to relatively low energy light (e.g., green laser light, red laser light) to produce additional species (e.g., hydrogen radicals) capable of dissociating hydrogen sulfide (e.g., via photocleavage). In FIG. 3, the sulfur-containing products (e.g., polysulfanes) generated by the reaction in FIG. 2 are exposed to light that is lower in energy (longer wavelength) than the high energy light used in FIG. 1. The relatively low energy light photolytically cleaves the sulfur-containing products to generate additional reactive species (e.g., sulfur-containing reactive species such as sulfur-containing radicals, hydrogen radicals). As shown in FIG. 4, the reactive species generated by the reaction depicted in FIG. 3 can react with hydrogen sulfide in the presence of the relatively low energy light to further drive the dissociation of hydrogen sulfide, forming additional sulfur-containing products. However, in some embodiments, the reaction depicted in FIG. 4 can occur without involving the relatively low energy light. Sulfur containing reactive species can also react with other sulfur-containing reactive species and/or hydrogen radicals to generate one or more sulfur-containing products (e.g., polysulfanes ($H_2S_x$), elemental sulfur).

In certain embodiments, the relatively low energy light depicted in FIG. 3 is a UVA light source, a visible light source (e.g., a green laser, a red laser), and/or an infrared (IR) light source. Without wishing to be bound by theory, it is believed that the use of the relatively low energy light can improve the energy efficiency of the hydrogen sulfide dissociation process.

In some embodiments, the wavelength of the relatively low energy light is at least 380 nm (e.g., at least 400 nm, at least 500 nm, at least 600) and at most 8900 nm (e.g., at most 1000 nm, at most 780 nm, at most 600 nm, at most 500 nm). As an example, in certain embodiments, the relatively low energy light is UV light having a wavelength of at least 400 nm. In some embodiments, the relatively low energy light has a wavelength of from 530 nm to 535 nm. In such embodiments, the relatively low energy light can be generated, for example, by a green laser. In some embodiments, the relatively low energy light has a wavelength of from 645 nm to 655 nm. In such embodiments, the relatively low energy light can be generated by a red laser.

In general, the power of the relatively low energy light can be selected as appropriate. Generally, the power is determined by the concentration of hydrogen sulfide and the gas flow rate. In some embodiments, the relatively low energy light has an intensity of at least 1 milliwatt (e.g. at least 1 watt, at least 1 kilowatt) and at most 1 megawatt (e.g. at most 1 kilowatt, at most 1 watt).

Ceramic Species

Figure 5:
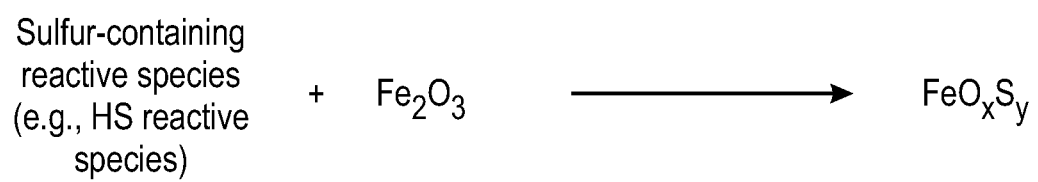
FIG. 5 is a scheme for a chemical reaction.
Figure 6:
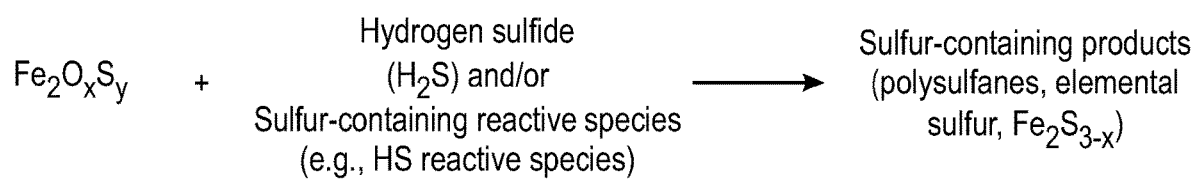
FIG. 6 is a scheme for a chemical reaction.

In certain embodiments, the methods of the disclosure include reacting the sulfur-containing reactive species with a ceramic species. In FIG. 5, the sulfur-containing reactive species (e.g., HS reactive species) generated in FIG. 1 reacts with a ceramic species ($Fe_2O_3$) to generate a ceramic-sulfur species ($Fe_2O_xS_y$). In certain embodiments, x is 0 to 3, y is 0 to 3, and x+y=3±0.5. In FIG. 6, the ceramic-sulfur species ($Fe_2O_xS_y$) generated in FIG. 5 reacts with hydrogen sulfide to dissociate additional hydrogen sulfide and to generate sulfur-containing products, such as, for example, elemental sulfur, polysulfanes (e.g., $H_2S_x$), and $Fe_2S_{3-x}$. Sulfur containing reactive species can also react with other sulfur-containing reactive species and/or the ceramic-sulfur species to generate one or more sulfur-containing products (e.g., polysulfanes ($H_2S_x$), elemental sulfur).

In some embodiments, the ceramic species (e.g., $Fe_2O_3$) and/or a ceramic-sulfur species (e.g., $Fe_2S_3$) pre-exists in the environment in which the hydrogen sulfide is present. As an example, in certain embodiments, the $Fe_2O_3$ is disposed on a surface of a component of a hydrocarbon producing well (e.g., a wellhead, a flow line, a production casing, a production tubing), a component to transport a hydrocarbon produced by a hydrocarbon producing well (e.g., a transportation pipeline), a gas treatment system (e.g., a tail gas treatment system), a borehole, and/or an underground formation.

Examples of ceramic species other than $Fe_2O_3$ that can be used in the reaction depicted in FIG. 5 include Fe, Cr, Mg, Mn, Ca, Ce, Zn, Na, Sb, Bi, V, Ba, Sr, CaC, Zn, V, $Na_2C$, Sb, Si, Al, Li, NaS, and/or lanthanides as well as their oxides.

Examples of ceramic-sulfur species other than $Fe_2O_xS_y$ that can be generated in the reaction depicted in FIG. 5 and used in the reaction depicted in FIG. 6 include $FeS_x$, $CrS_x$, $MgS_x$, $MnS_x$, $CaS_x$, $CeS_x$, $ZnS_x$, $NaS_x$, $SbS_x$, $BiS_x$, $VS_x$, $BaS_xO_{4-y}$, $SrS_xO_{4-y}$, $FeS_xO_y$, $CrS_xO_y$, $MgS_xO_y$, $MnS_xO_y$, $CaS_xO_y$, $CeS_xO_y$, $CaCS_xO_y$, $ZnS_xO_y$, $VS_xO_y$, $Na_2CS_xO_y$, $SbS_xO_y$, $SiS_xO_y$, lanthanide sulfides, lanthanide oxysulfides, and/or lanthanide sulfites.

Without wishing to be bound by theory, it is believed that, in some embodiments, the sulfur-containing product (e.g., $Fe_2O_3$) generated in FIG. 5 can absorb and/or adsorb sulfur-containing compounds (e.g., hydrogen sulfide, polysulfides, sulfites, polysulfanes, $CS_2$, $SO_2$), other contaminants and/or heavy metals. In some embodiments, the sulfur containing-products generated may also precipitate in the underground formation (e.g., in formation water).

Systems

The reactions depicted in FIG. 1-6 can be performed in a component of a hydrocarbon producing well (e.g., a wellhead, a flow line, a production casing, a production tubing), a component to transport a hydrocarbon produced by a hydrocarbon producing well (e.g., a transportation pipeline), a gas treatment system (e.g., a tail gas treatment system), a borehole, and/or an underground formation.

Figure 7:
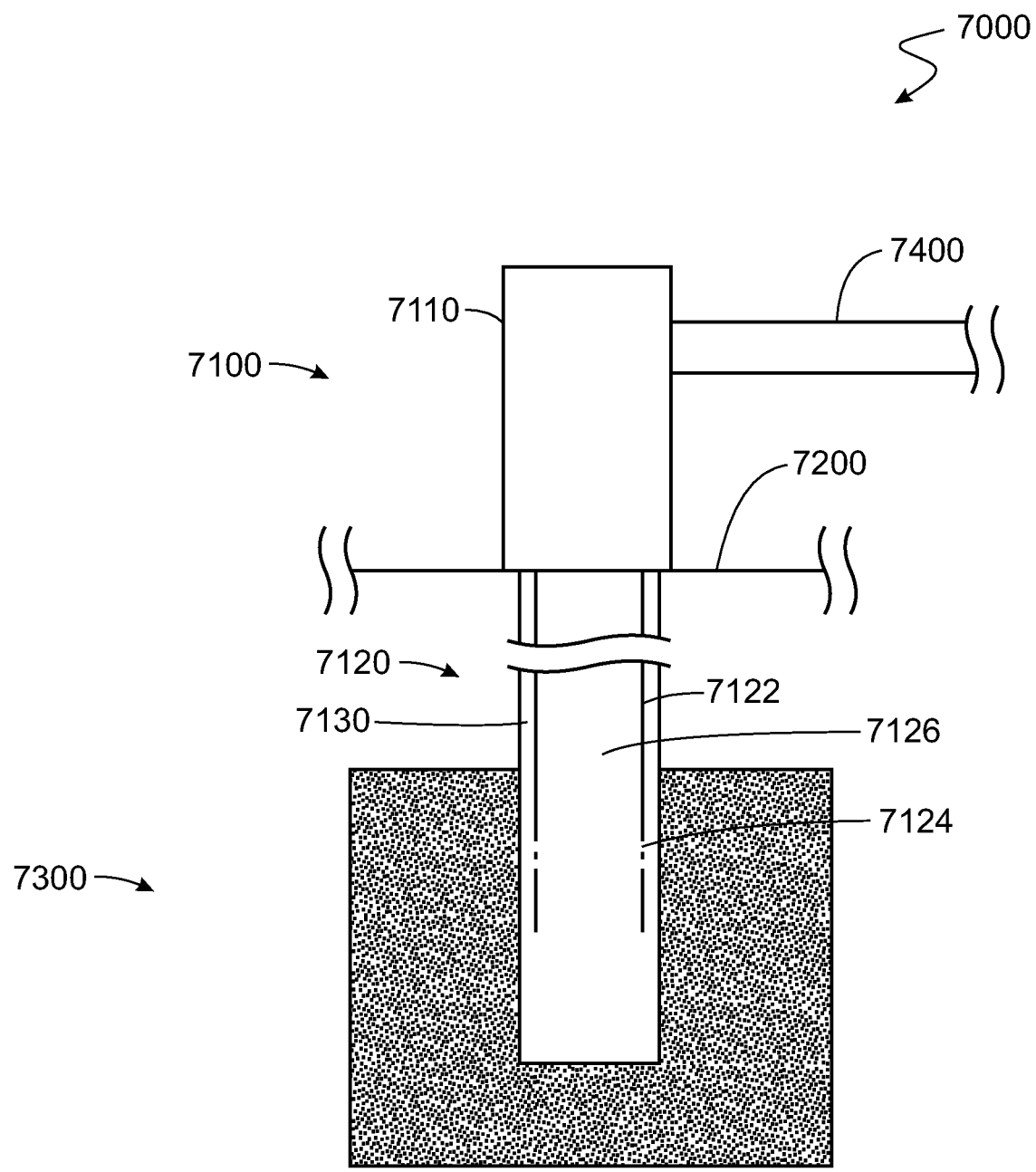
FIG. 7 schematically depicts a system that includes a hydrocarbon-producing well.

FIG. 7 schematically depicts a system 7000 that includes a hydrocarbon-producing (e.g., hydrocarbon-containing gas mixture) well 7100 having a first portion 7110 above a surface of the earth 7200 and a second portion 7120 that extends below the surface 7200, through a borehole 7130, and into an underground formation 7300. The portion 7120 includes a casing 7122 having perforations 7124. The well 7100 is designed so that the perforations 7124 allow for fluid communication between an interior region 7126 of the casing 7122 and the underground formation 7300. The hydrocarbon producing well 7100 include a pipe 7400 enabling the hydrocarbon-containing gas mixture produced by the well 7100 to be transported from the well for subsequent storage and/or processing.

High energy light and/or the relatively low energy light can be delivered to the interior of the portion 7110 (e.g., a wellhead), the interior of the portion 7120 (e.g., the casing 7122, a production tubing), the interior of the pipe 7400, the borehole 7130 and/or the underground formation 7300 to photolytically cleave hydrogen sulfide present in the hydrocarbon-containing gas mixture, generating the reactive sulfur species. In certain embodiments, a waveguide (e.g., an optical fiber) is used to deliver the high energy light and/or the relatively low energy light source.

In some embodiments, the relatively high temperatures (e.g. at least 70° C., at least 115° C.) and/or pressures found in a hydrocarbon producing well and/or a component to transport a hydrocarbon produced by a hydrocarbon producing well can further drive the hydrogen sulfide dissociation reaction. Such embodiments can involve the use of natural geothermal energy.

Other Embodiments

While certain embodiments have been disclosed above, the disclosure is not limited to such embodiments.

As an example, while embodiments have been disclosed that include sulfur-containing reactive species that react with hydrogen sulfide, the disclosure is not limited to such embodiments. In some embodiments, additionally or alternatively, a hydrogen radical is generated that can react with hydrogen sulfide.

As an additional example, while embodiments have been disclosed in which an external catalyst is not added to the gas containing the hydrogen sulfide, in some embodiments, the methods of the disclosure can include such an externally added catalyst (e.g. a photocatalyst, an electrocatalyst, an organic catalyst, a thermocatalyst) to assist in the cleavage of hydrogen sulfide.

As another example, while embodiments have been disclosed that include systems and methods related to hydrocarbon production, the disclosure is not limited to such embodiments. In some embodiments, the systems and methods of the disclosure can be used, for example, in methods and systems related to sewage processing and/or metallurgy.

As a further example, in some embodiments, the methods of the disclosure can be implemented in combination with another desulfurizing process (e.g., the Claus process, a tail gas processing system).

As another example, in some embodiments, the systems and methods of the disclosure include the use of a retrievable support (e.g., an expandable packer) to produce a catalyst in situ. In such embodiments, the retrievable support delivers a precursor to form a photocatalyst.

What is claimed:

1. A method, comprising:
irradiating a gas mixture comprising first and second portions of hydrogen sulfide ($H_2S$) with light to photolytically cleave the first portion of the hydrogen sulfide in the gas mixture, thereby generating a sulfur-containing reactive species, the gas mixture being in a member selected from the group consisting of at least one component of a hydrocarbon producing well, at least one component configured to transport a hydrocarbon produced by a hydrocarbon producing well, a gas treatment system, a borehole and an underground formation; and
reacting the sulfur-containing reactive species with the second portion of the hydrogen sulfide in the gas mixture to generate a sulfur-containing product,
wherein the first portion of the hydrogen sulfide is different from the second portion of the hydrogen sulfide, and the light has a wavelength of at most 380 nanometers (nm).

2. The method of claim 1, wherein the member comprises at least one component selected from the group consisting of a wellhead, a flow line, a production casing, a production tubing, a tail gas treatment system, a borehole, a transportation pipeline and an underground formation.

3. The method of claim 1, wherein the sulfur-containing reactive species comprises at least one member selected from the group consisting of an $HS_x$ radical, where x=1-8.

4. The method of claim 1, wherein the sulfur-containing product comprises at least one member selected from the group consisting of polysulfanes and elemental sulfur.

5. The method of claim 1, wherein at least one of the following holds:
the sulfur-containing product adsorbs at least one species selected from the group consisting of hydrogen sulfide, polysulfides, sulfites, polysulfanes, $CS_2$, $SO_2$ and heavy metals; and
the sulfur-containing product absorbs at least one species selected from the group consisting of hydrogen sulfide, polysulfides, sulfites, polysulfanes, $CS_2$, $SO_2$ and heavy metals.

6. The method of claim 1, wherein the wavelength of the light is from 100 nanometers (nm) to 380 nm.

7. The method of claim 1, wherein a power of the light is from 1 milliwatt to 1 megawatt.

8. The method of claim 1, further comprising:
irradiating the sulfur-containing product with light having a wavelength of at least 380 nm to generate a reactive species; and
reacting the reactive species with hydrogen sulfide to generate additional sulfur-containing product.

9. The method of claim 1, wherein at least one of the following holds:
irradiating the gas mixture with light to photolytically cleave the first portion of the hydrogen sulfide in the gas mixture generates hydrogen radicals; or
the sulfur-containing reactive species comprises a first portion of sulfur-containing reactive species and a second portion of sulfur-containing reactive species different from the first portion, and the first portion of the sulfur-containing reactive species reacts with the second portion of the sulfur-containing reactive species to generate a sulfur-containing product.

10. The method of claim 1, further comprising:
reacting the sulfur-containing reactive species with a ceramic species to form a ceramic-sulfur species; and reacting the ceramic-sulfur species with an additional portion of hydrogen sulfide in the gas mixture to provide additional sulfur-containing reaction product.

11. The method of claim 10, wherein:
the member comprises at least one component selected from the group consisting of a wellhead, a flow line, a production casing, a production tubing, a tail gas treatment system a borehole, a transportation pipeline and an underground formation; and
the ceramic species is disposed on a surface of the member.

12. The method of claim 10, wherein the ceramic species comprises at least one member selected from the group consisting of Fe, Cr, Mg, Mn, Ca, Ce, Zn, Na, Sb, Bi, V, Ba, Sr, CaC, Zn, V, Na$_2$C, Sb, Si, Al, Li, Na, K and a lanthanide.

13. The method of claim 10, wherein the ceramic-sulfur species comprises at least one member selected from the group consisting of FeS$_x$, CrS$_x$, MgS$_x$, MnS$_x$, CaS$_x$, CeS$_x$, ZnS$_x$, NaS$_x$, SbS$_x$, BiS$_x$, VS$_x$, BaS$_x$O$_{4-y}$, SrS$_x$O$_{4-y}$, FeS$_x$O$_y$, CrS$_x$O$_y$, MgS$_x$O$_y$, MnS$_x$O$_y$, CaS$_x$O$_y$, CeS$_x$O$_y$, CaCS$_x$O$_y$, ZnS$_x$O$_y$, VS$_x$O$_y$, Na$_2$CS$_x$O$_y$, SbS$_x$O$_y$, SiS$_x$O$_y$, lanthanide sulfides, lanthanide oxysulfides, and lanthanide sulfites.

14. The method of claim 10, wherein the sulfur-containing reactive species comprises at least one member selected from the group consisting of an HS$_x$ radical, where x=1-8, and HS$^-$.

15. The method of claim 10, wherein the sulfur-containing product comprises at least one member selected from the group consisting of polysulfanes, elemental sulfur and a product containing both the ceramic and sulfur.

16. The method of claim 10, wherein at least one of the following holds:
the sulfur-containing product adsorbs at least one species selected from the group consisting of hydrogen sulfide, polysulfides, sulfites, polysulfanes, CS$_2$, SO$_2$ and heavy metals; or
the sulfur-containing product absorbs at least one species selected from the group consisting of hydrogen sulfide, polysulfides, sulfites, polysulfanes, CS$_2$, SO$_2$ and heavy metals.

17. The method of claim 10, wherein:
the ceramic species comprises Fe$_2$O$_3$;
the ceramic-sulfur species comprises Fe$_2$O$_x$S$_y$; and
the sulfur-containing product comprises at least one member selected from the group consisting of elemental sulfur, polysulfanes, and Fe$_2$S$_{3-x}$.

* * * * *